(12) United States Patent
Sasahara (10) Patent No.: US 10,198,722 B2
(45) Date of Patent: Feb. 5, 2019

(54) COMMODITY-SALES-DATA PROCESSING APPARATUS, COMMODITY-SALES-DATA PROCESSING METHOD, AND COMPUTER-READABLE STORAGE MEDIUM

(71) Applicant: TOSHIBA TEC KABUSHIKI KAISHA, Shinagawa-ku, Tokyo (JP)

(72) Inventor: Katsuya Sasahara, Shizuoka (SG)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 58 days.

(21) Appl. No.: 14/799,889

(22) Filed: Jul. 15, 2015

(65) Prior Publication Data

US 2017/0017944 A1    Jan. 19, 2017

(51) Int. Cl.
| | |
|---|---|
| *G06K 9/00* | (2006.01) |
| *G06Q 20/20* | (2012.01) |
| *G07G 1/06* | (2006.01) |
| *G07G 1/00* | (2006.01) |
| *G06F 3/042* | (2006.01) |
| *G07G 1/01* | (2006.01) |

(52) U.S. Cl.
CPC ......... *G06Q 20/208* (2013.01); *G06Q 20/20* (2013.01); *G06Q 20/201* (2013.01); *G07G 1/0036* (2013.01); *G07G 1/06* (2013.01); *G06F 3/0425* (2013.01); *G06T 2207/30128* (2013.01); *G07G 1/01* (2013.01)

(58) Field of Classification Search
CPC ............. G06K 7/01; G06K 9/00; H04N 5/335
See application file for complete search history.

(56) References Cited

U.S. PATENT DOCUMENTS 7,448,542 B1 * 11/2008 Bobbitt ................ G06Q 20/208
                                                          186/61
2005/0245302 A1    11/2005 Bathiche et al.
(Continued)

FOREIGN PATENT DOCUMENTS

EP           2669862         12/2013

OTHER PUBLICATIONS

Extended European Search Report for European Patent Application No. 16177539.0 dated Sep. 29, 2016.

(Continued)

*Primary Examiner* — Talia F Crawley
(74) *Attorney, Agent, or Firm* — Amin, Turocy & Watson LLP (57) ABSTRACT

According to one embodiment, a commodity-sales-data processing apparatus includes a display section, an image pickup section, an identifying section, a price-information acquiring section, and an amount calculating section. The image pickup section picks up images of commodities placed in a predetermined image pickup region on a display region of the display section. The identifying section identifies the commodities disposed in the predetermined image pickup region on the basis of the images picked up by the image pickup section. The price-information acquiring section acquires price information concerning prices of the commodities identified by the identifying section. The amount calculating section calculates a payment amount for the commodities on the basis of the price information acquired by the price-information acquiring section.

6 Claims, 11 Drawing Sheets

(56) References Cited

U.S. PATENT DOCUMENTS

| | | | |
|---|---|---|---|
| 2009/0171798 A1 | 7/2009 | Sasaki et al. | |
| 2010/0158310 A1* | 6/2010 | McQueen | G06K 9/00 382/100 |
| 2012/0047038 A1 | 2/2012 | Sano et al. | |
| 2012/0187191 A1* | 7/2012 | Olmstead | G07G 1/0045 235/462.13 |
| 2013/0036024 A1* | 2/2013 | Boettcher | G06Q 30/06 705/26.8 |
| 2013/0320084 A1 | 5/2013 | Amada et al. | |
| 2013/0231992 A1 | 9/2013 | Sugasawa et al. | |
| 2014/0140574 A1* | 5/2014 | Takeno | G06K 9/00671 382/103 |
| 2014/0316916 A1* | 10/2014 | Hay | G06O 20/18 705/17 |
| 2016/0019514 A1* | 1/2016 | Landers, Jr. | G06Q 20/201 705/20 |
| 2016/0119492 A1 | 4/2016 | Sasahara | |
| 2016/0259463 A1 | 9/2016 | Sasahara | |
| 2016/0267369 A1* | 9/2016 | Picard | G06K 7/1417 |
| 2016/0292661 A1* | 10/2016 | Kwan | H04N 7/181 |

OTHER PUBLICATIONS

Olwal, et al. "SurfaceFusion: Unobtrusive Tracking of Everyday Objects in Tangible User Interfaces", Graphics Interface 2008, pp. 235-242.

European Office Action for European Patent Application No. 16177539.0 dated Jul. 31, 2018.

* cited by examiner

| BARCODE IDENTIFICATION INFORMATION | REGISTERED IMAGE | COMMODITY NAME | SELLING PRICE | DISCOUNT INFORMATION |
|---|---|---|---|---|
| 1111 | IMAGE FROM ABOVE.jpg | Cabbage | 200 JPY | — |
| 1112 | IMAGE FROM ABOVE.jpg / IMAGE FROM SIDE.jpg | Paper towel | 300 JPY | DISCOUNT OF 30% FOR PURCHASE OF THREE ITEMS |
| ... | ... | ... | ... | ... |
| 9999 | | Butter | 500 JPY | — |

FIG. 11

COMMODITY-SALES-DATA PROCESSING APPARATUS, COMMODITY-SALES-DATA PROCESSING METHOD, AND COMPUTER-READABLE STORAGE MEDIUM

FIELD

Embodiments described herein relate generally to a technique for calculating a payment amount of commodities on the basis of images obtained by subjecting the commodities to image pickup.

BACKGROUND

There has been known a commodity-sales-data processing system that reads barcodes of commodities with a handy scanner or a stationary scanner and performs accounting processing for the commodities.

However, in the commodity-sales-data processing system, for example, it is difficult to avoid a mistake of an accounting amount that occurs when an operator scans a barcode of the same commodity twice.

DETAILED DESCRIPTION

Figure 1:
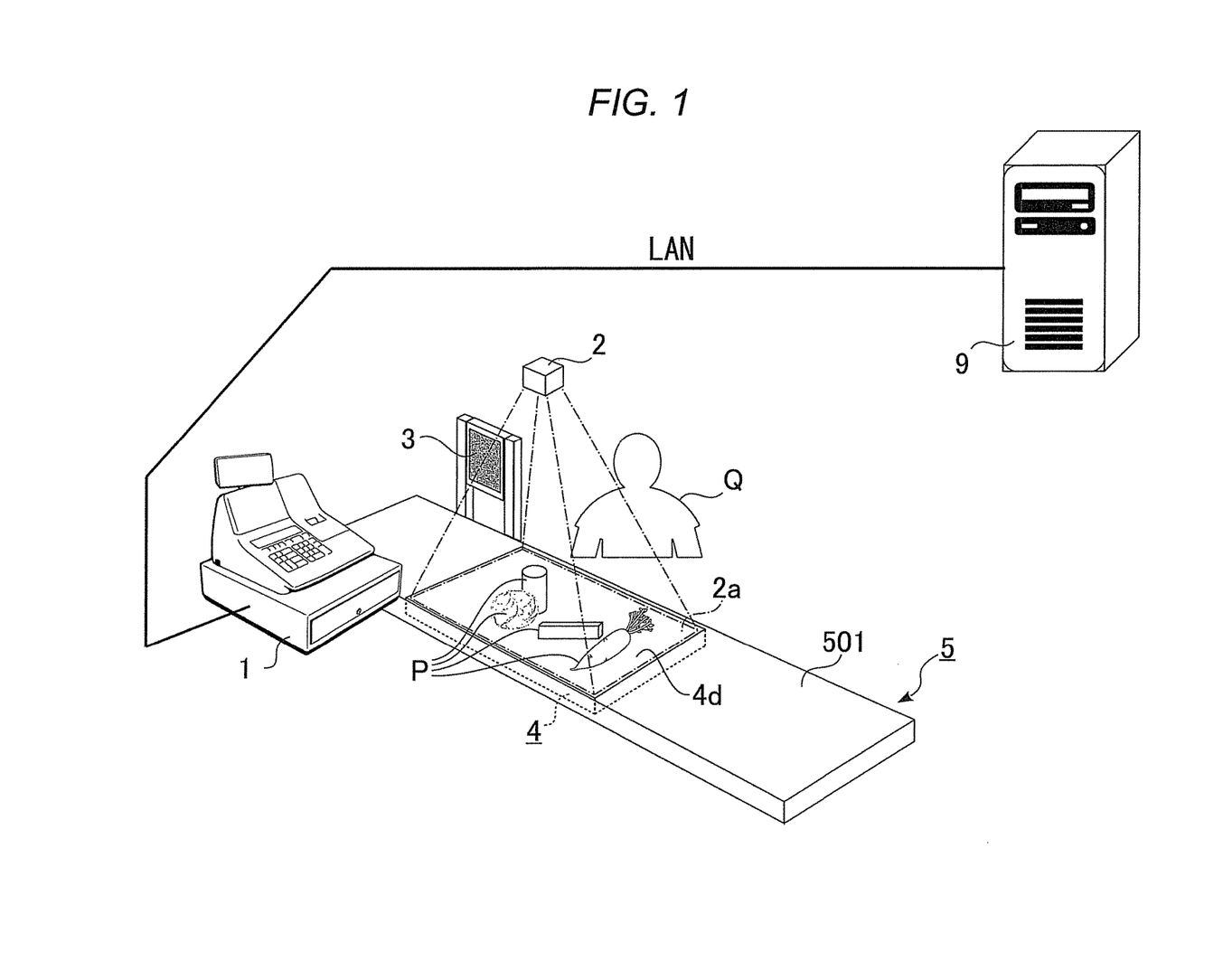
FIG. 1 is a system configuration diagram for explaining a commodity-sales-data processing system according to an embodiment.

An embodiment is explained below with reference to the drawings.
System Configuration FIG. 1 is a system configuration diagram for explaining a commodity-sales-data processing system according to an embodiment.

The commodity-sales-data processing system includes, for example, a commodity-sales-data processing apparatus 1, a camera 2, a barcode scanner 3, and a touch panel display 4.

The commodity-sales-data processing apparatus 1, the camera 2 (an image pickup section), the barcode scanner 3, and the touch panel display 4 (a display section) are connected to be capable of communicating with one another via an electric communication line such as a LAN (Local Area Network).

The commodity-sales-data processing apparatus 1 is configured from, for example, a cash register or a PC (Personal Computer) installed with a computer program for functioning as the cash register.

The barcode scanner 3 has a role of a scanner that reads barcodes attached to commodities.

The touch panel display 4 is disposed with a display screen thereof facing upward. The touch panel display 4 configures a part of a placing surface of a placing table 5 functioning as a commodity placing table during accounting of commodities purchased by a customer Q (see FIG. 1).

The camera 2 is configured from, for example, a CCD camera. The camera 2 picks up, from above, images of commodities P placed in a predetermined image pickup region 2a on a display region 4a of a screen of the touch panel display 4. The camera 2 can be supported by a not-shown column or the like provided on, for example, the ceiling of a store or the placing table 5.

Figure 2:
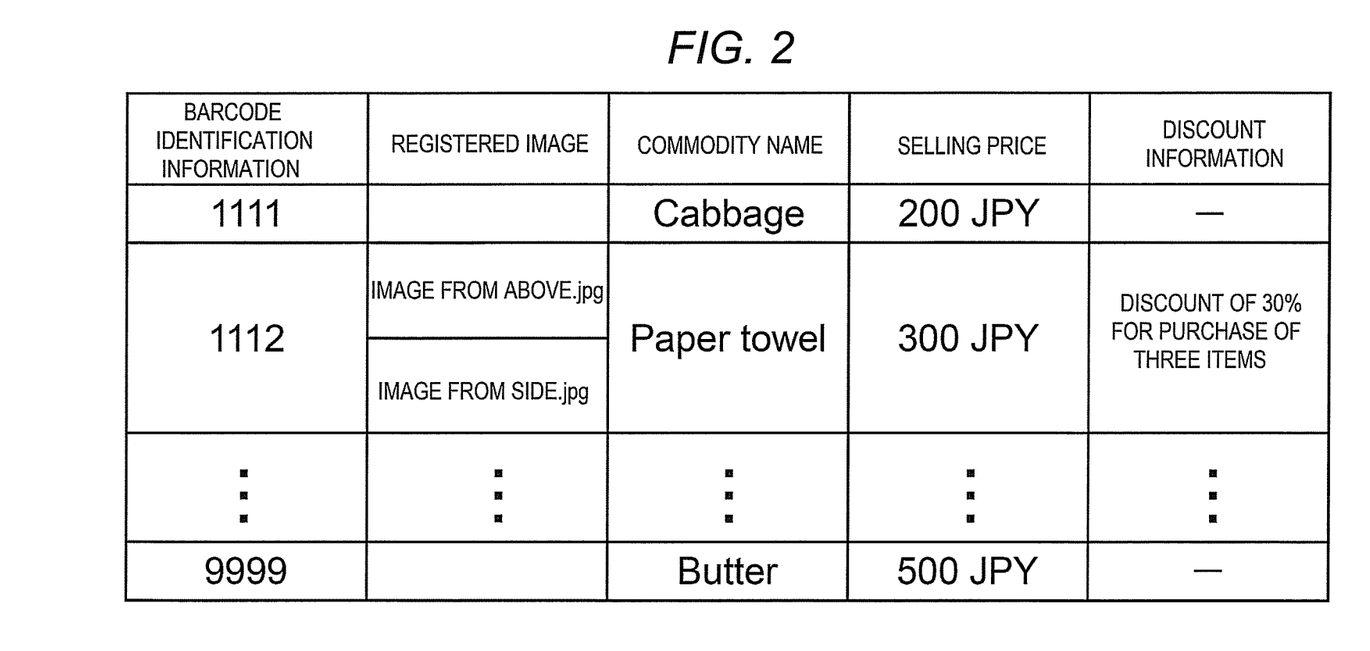
FIG. 2 is a diagram showing an example of a data table.

The server 9 stores, for example, as a data table shown in FIG. 2, identification information of barcodes attached to commodities, which are accounting targets, and images obtained by subjecting the commodities to image pickup and price information such as "price" and "discount information" associated with the identification information and the images.

Naturally, the images obtained by subjecting the commodities to image pickup and the price information such as "price" and "discount information" associated with the images can also be stored in the server 9 as a data table.

Figure 3:
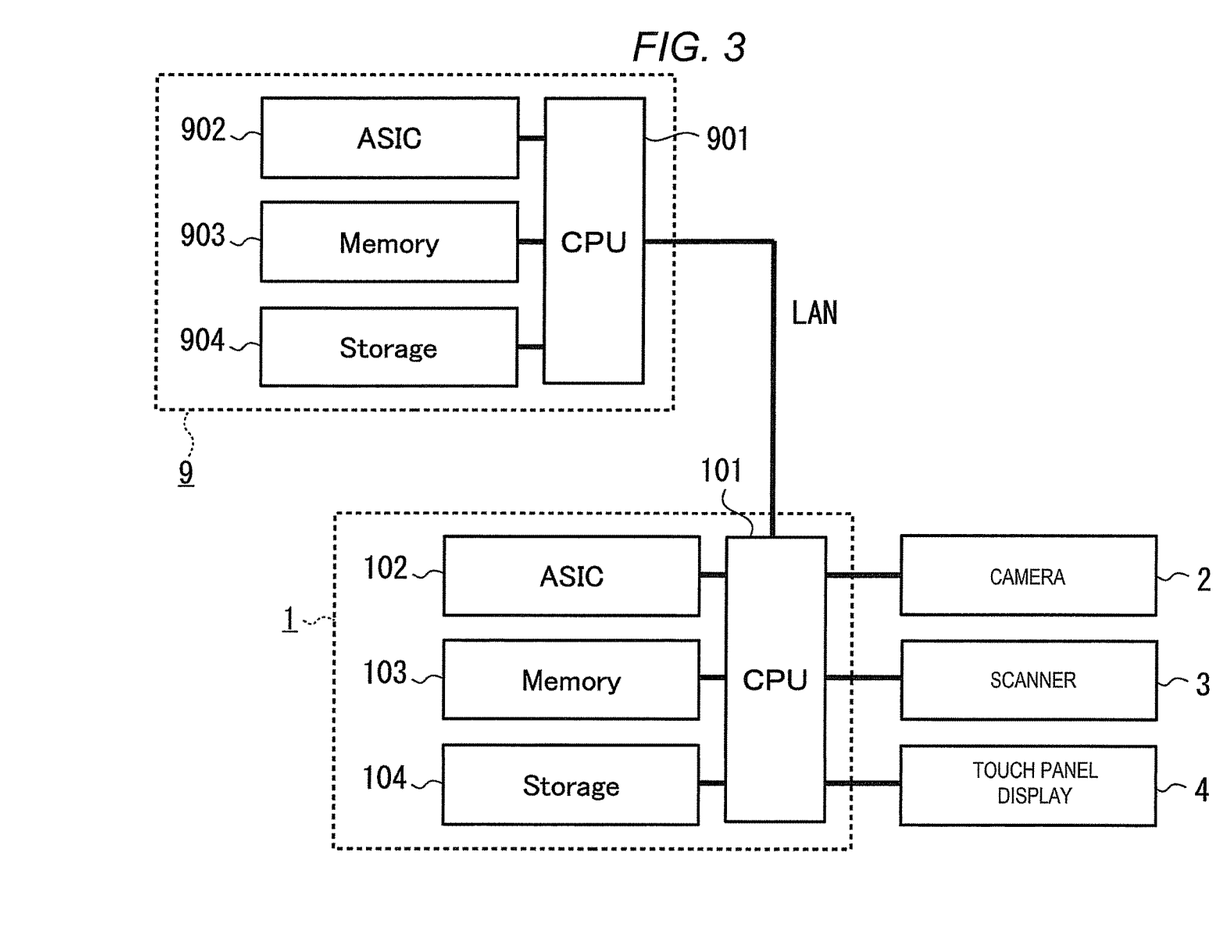
FIG. 3 is a functional block diagram for explaining the commodity-sales-data processing system.

The server 9 receives, from the commodity-sales-data processing apparatus 1, identification information read from commodities using the barcode scanner 3 or images obtained by subjecting the commodities to image pickup with the camera 2 and returns price information associated with the received information to the commodity-sales-data processing apparatus 1.
Functional Blocks FIG. 3 is a functional block diagram for explaining the commodity-sales-data processing system.

The commodity-sales-data processing apparatus 1 includes, for example, a CPU (a processor) 101, an ASIC (Application Specific Integrated Circuit) 102, a memory 103, and a storage 104.

The camera 2, the barcode scanner 3, and the touch panel display 4 are connected to the CPU 101 via an electric communication line such as a USB line, a LAN line, or Wifi. The CPU 101 also has a role of acquiring data acquired by the camera 2 and the barcode scanner 3 and controlling information that the CPU 101 causes the touch panel display 4 to display.

The server 9 includes a CPU (a processor) 901, an ASIC (Application Specific Integrated Circuit) 902, a memory 903, and a storage 904. The data table shown in FIG. 2 can be stored in, for example, the storage 904.

In the commodity-sales-data processing system according to this embodiment, the CPU 101 and the CPU 901 have a role of performing various kinds of processing in the commodity-sales-data processing system. The CPU 101 and the CPU 901 also have a role of realizing various functions by executing computer programs stored in the memory 103, the memory 903, the storage 104, the storage 904, and the like.

Note that, in the example explained above, the processor is the CPU (Central Processing Unit). However, it goes without saying that the processor can also be realized by an MPU (Micro Processing Unit) capable of executing equivalent arithmetic processing. Similarly, the storage 104 and the storage 904 can be replaced with a storage device such as a HDD (Hard Disk Drive) or a flash memory.

The memory 103 and the memory 903 can be configured from, for example, a RAM (Random Access Memory), a ROM (Read Only Memory), a DRAM (Dynamic Random Access Memory), an SRAM (Static Random Access Memory), a VRAM (Video RAM), or a flash memory. The memory 103 and the memory 903 have a role of storing various kinds of information and computer programs used in the commodity-sales-data processing system.

Operation Explanation

Figure 4:
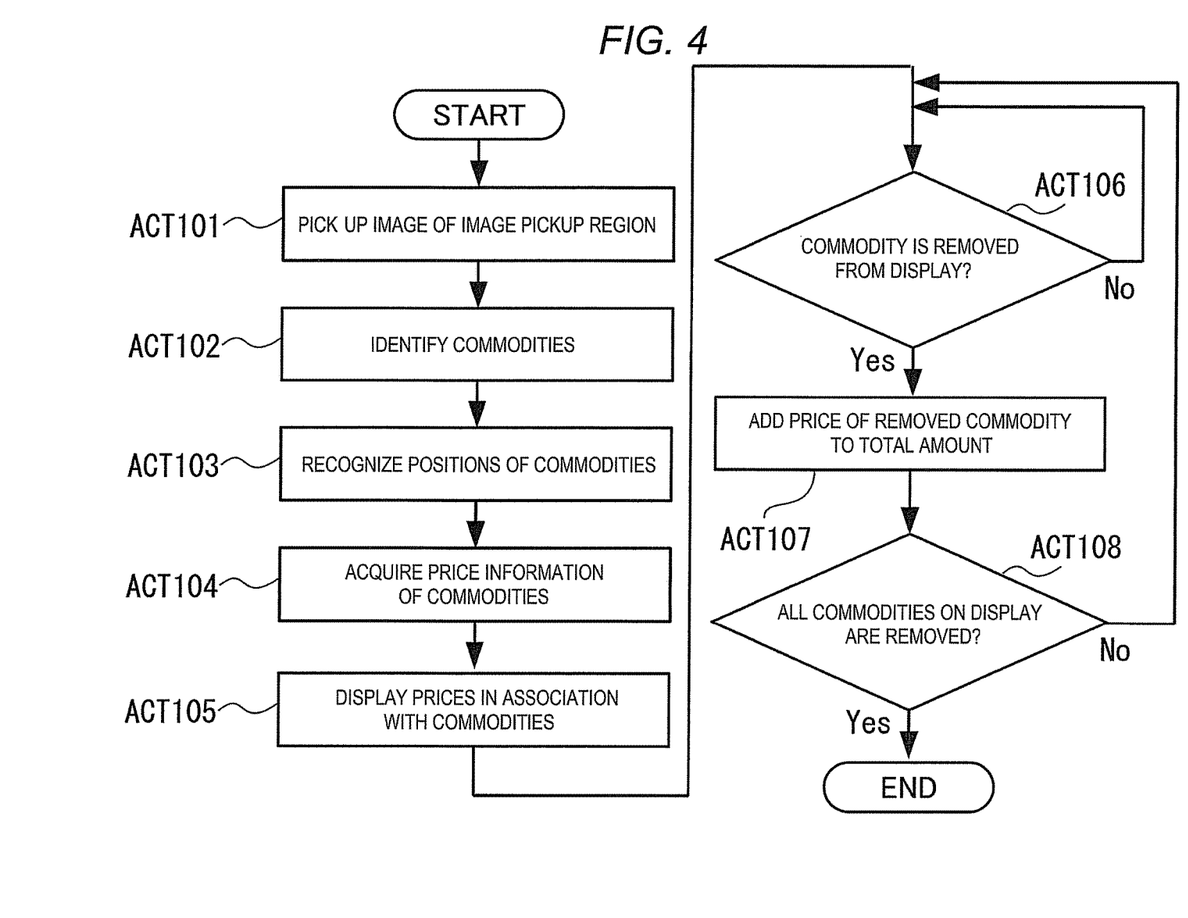
FIG. 4 is a flowchart for explaining a flow of processing in the commodity-sales-data processing system.

FIG. 4 is a flowchart for explaining a flow of processing in the commodity-sales-data processing system.

Figure 5:
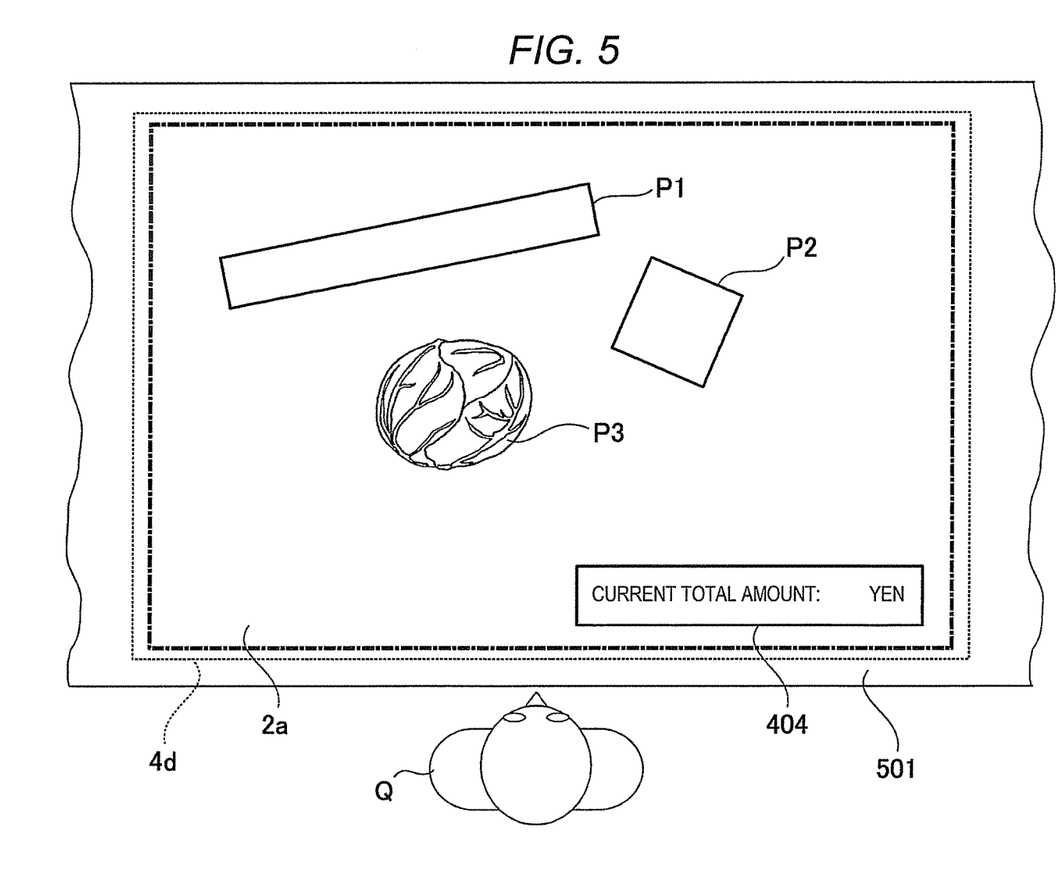
FIG. 5 is a diagram for explaining a flow of accounting processing in the commodity-sales-data processing system.

First, the CPU 101 causes the camera 2 to pick up images of the commodities P placed in the image pickup region 2a on a display screen 4d (a display region) of the touch panel display 4 (ACT 101). As an example, as shown in FIG. 5, three commodities, i.e., a paper towel P1, butter P2, and a cabbage P3 are placed on the display screen of the touch panel display 4.

The CPU 101 (a display control section) preferably changes a display color on the touch panel display 4 during the image pickup of the commodities by the camera 2. Consequently, even if a color of a background image of the touch panel display 4 and colors of the commodities are similar, by changing the color of the background image, it is possible to generate hue differences and brightness differences in boundaries between the commodities and the screen and surely detect the contours of the commodities.

The CPU 101 (an identifying section) identifies, on the basis of image data obtained by subjecting the commodities P to image pickup, commodities corresponding to the image data on the data table stored in the server 9 (ACT 102).

For example, when the CPU 101 is successful in reading of barcodes attached to the commodities with the camera 2, the CPU 101 can identify the commodities on the basis of identification information of the barcodes. On the other hand, if it is difficult to read the barcodes attached to the commodities with the camera 2 because of angles and postures of the placement of the commodities, the CPU 101 performs coincidence ratio determination of colors, dimensions, shapes, and the like of external images of the commodities P picked up by the camera 2 and images registered in the data table and performs, on the basis of information concerning a commodity associated with the image having the highest coincidence ratio, identification of the commodity. Naturally, if it is estimated that accuracy of the barcode reading is low, it is also possible to improve identification accuracy of the commodities by combining commodity identification based on the external images.

If commodity identification based on a picked-up image in the camera 2 is difficult, if a barcode is attached to the commodity, by reading the barcode with the barcode scanner 3, it is possible to add price information based on identification information of the barcode to an accounting amount.

Subsequently, the CPU 101 (a position recognizing section) recognizes, on the basis of images picked up by the camera 2, the positions (the coordinates on the display region) and the postures (the disposition angles on the display region) of the commodities disposed in the predetermined image pickup region 2a (ACT 103). Note that the recognition of the positions, the postures, and the like of the commodities is executed after the identification of the commodities (ACT 102). However, the recognition may be executed simultaneously with the identification of the commodities (ACT 102) or may be executed earlier than the identification of the commodities (ACT 102).

Figure 6:
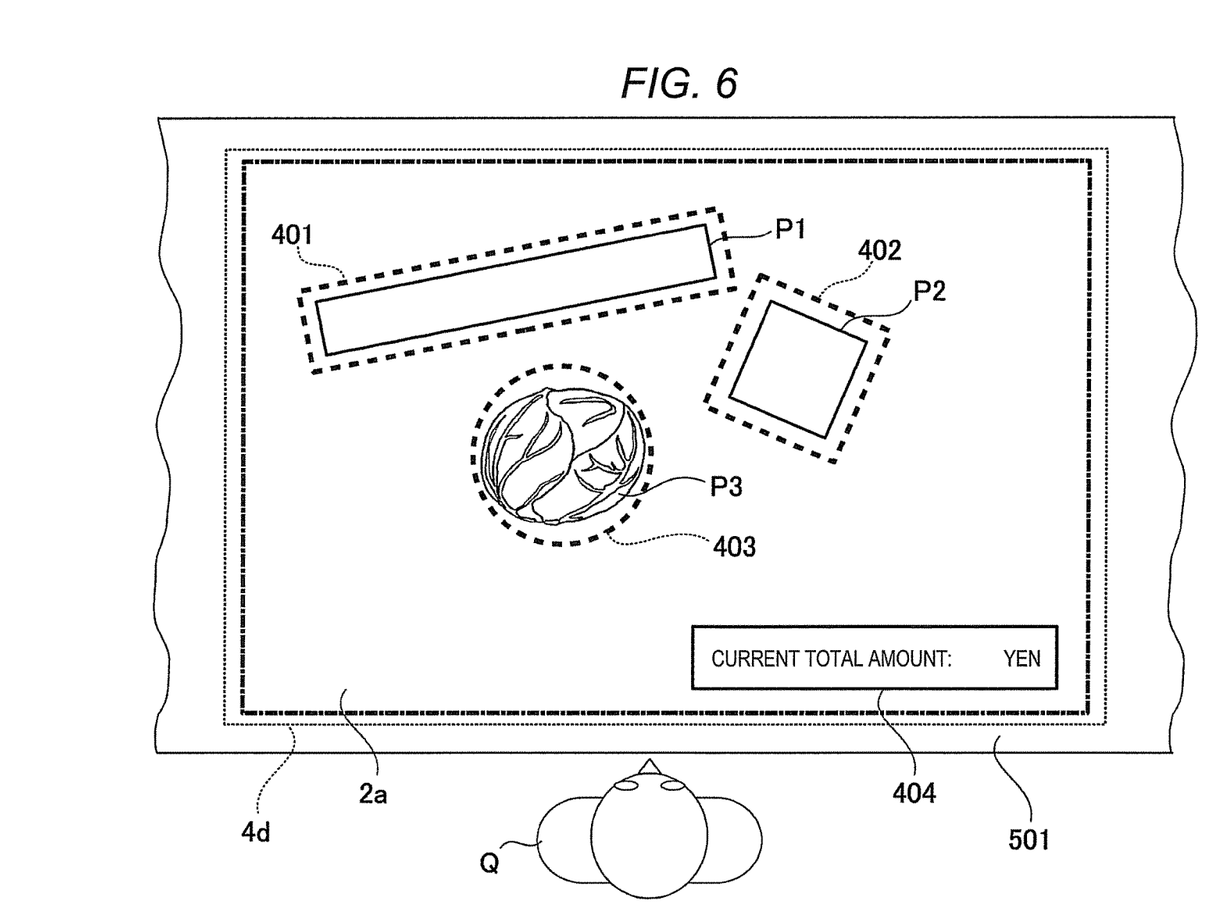
FIG. 6 is a diagram for explaining the flow of the accounting processing in the commodity-sales-data processing system.

The CPU 101 displays, around the commodities placed on the display screen of the touch panel display 4, frames 401 to 403 indicating that the commodities are recognized (FIG. 6). Naturally, as a result, the customer Q and an operator of the commodity-sales-data processing apparatus 1 only have to be able to visually recognize that the commodities are recognized. The recognition of the commodities is not always limited to the display by the frames. For example, it is also possible to change background colors of regions corresponding to the commodities or change brightness of the regions.

Subsequently, the CPU 101 (a price-information acquiring section) acquires, from, for example, the data table stored in the server 9, price information (selling prices, discount information, etc.) concerning prices of the commodities identified as explained above (ACT 104)

Subsequently, the CPU 101 (the display control section) causes, on the basis of the positions and the postures recognized concerning the commodities on the display screen of the touch panel display 4, the touch panel display 4 to display, in display regions corresponding to the commodities, the price information of which is acquired, an amount based on the price information acquired concerning the commodities (FIG. 7) (ACT 105).

Figure 7:
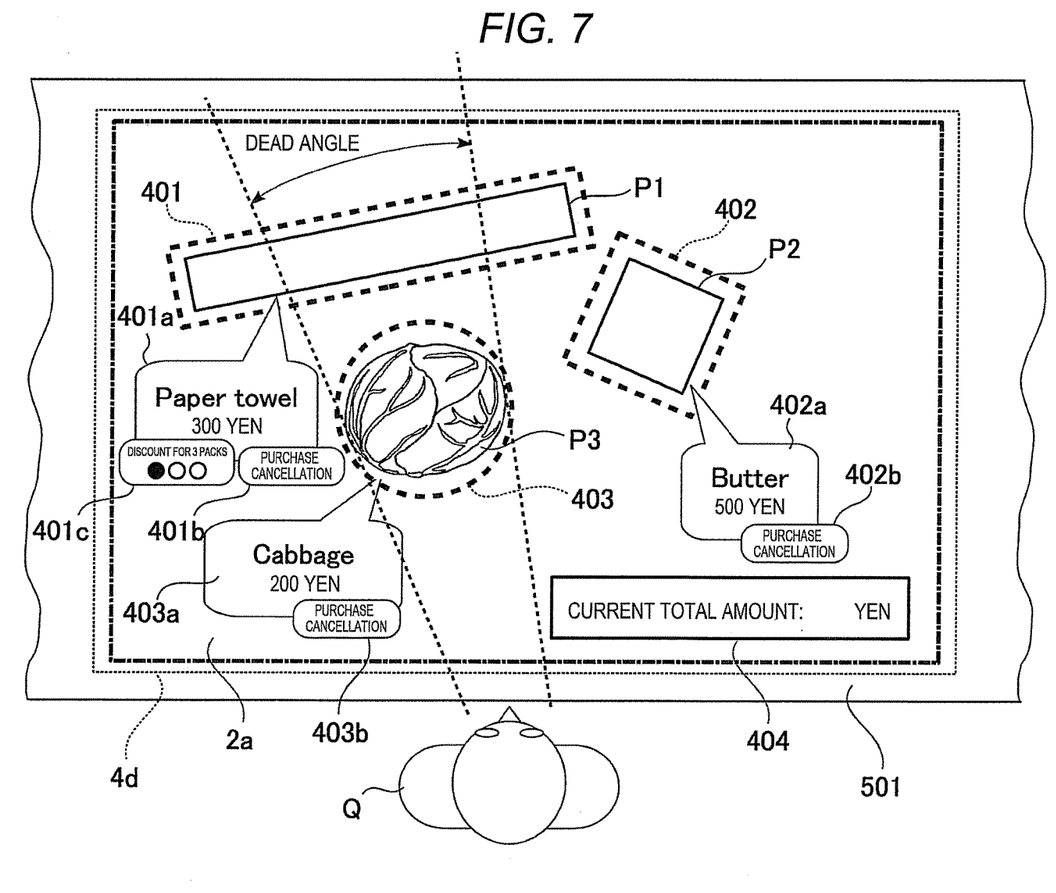
FIG. 7 is a diagram for explaining the flow of the accounting processing in the commodity-sales-data processing system.

When causing the touch panel display 4 to display selling prices 401a to 403a of the commodities on the display screen thereof, the CPU 101 (the display control section) causes the touch panel display 4 to display the selling prices in display regions other than a display region likely to be a dead angle from the customer Q to prevent the display selling prices from being less easily seen from an assumed standing position of the customer Q by being obstructed by the commodity (the cabbage P3) placed on the near side.

This is particularly effective when the customer Q places a tall commodity on the near side. It is possible to automatically discriminate, by associating, for example, information concerning heights and capacities with the data table concerning the commodities, whether the commodity placed on the near side by the customer Q is tall.

The CPU 101 (the display control section) acquires, on the basis of the data table stored in the storage 904 of the server 9, discount information for specifying discount in the case of bulk purchase of a predetermined number of items. Consequently, the CPU 101 (the display control section) indicates with an icon 401c that the discount is applied when three paper towels are purchased. In FIG. 7, since only one paper towel is placed on a display screen 4d of the touch panel display 4, the discount is not applied.

Subsequently, the CPU 101 (an amount calculating section) calculates a payment amount for the commodities on the basis of the price information acquired as explained above.

Figure 8:
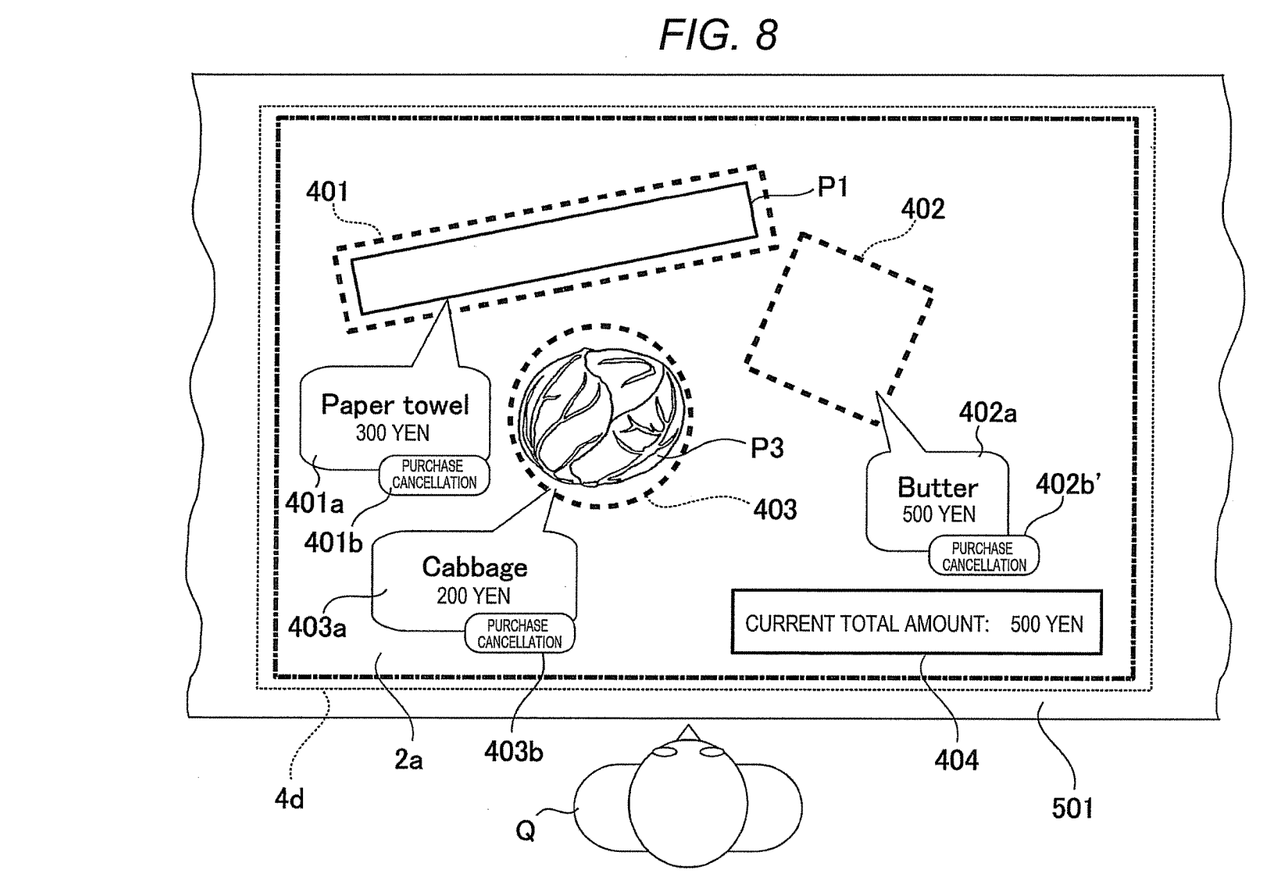
FIG. 8 is a diagram for explaining the flow of the accounting processing in the commodity-sales-data processing system.
Figure 9:
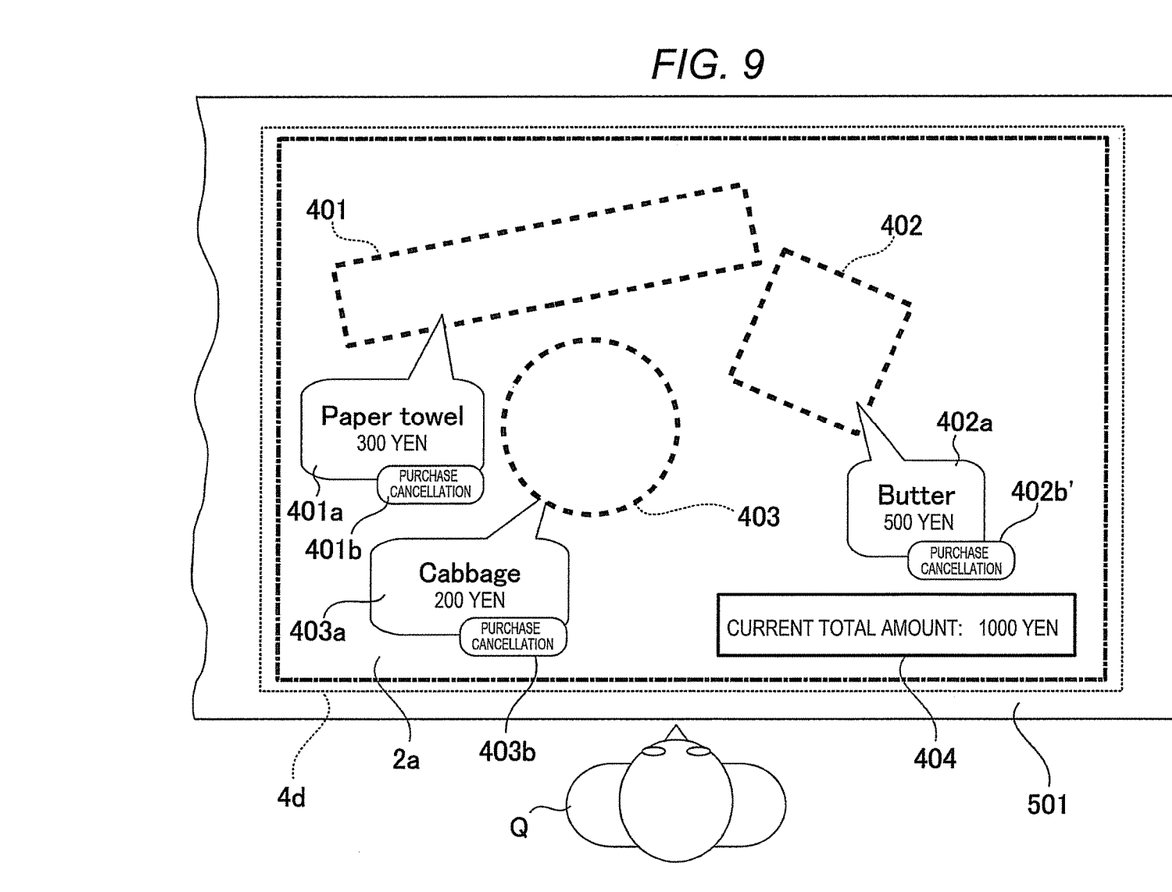
FIG. 9 is a diagram for explaining the flow of the accounting processing in the commodity-sales-data processing system.
Figure 10:
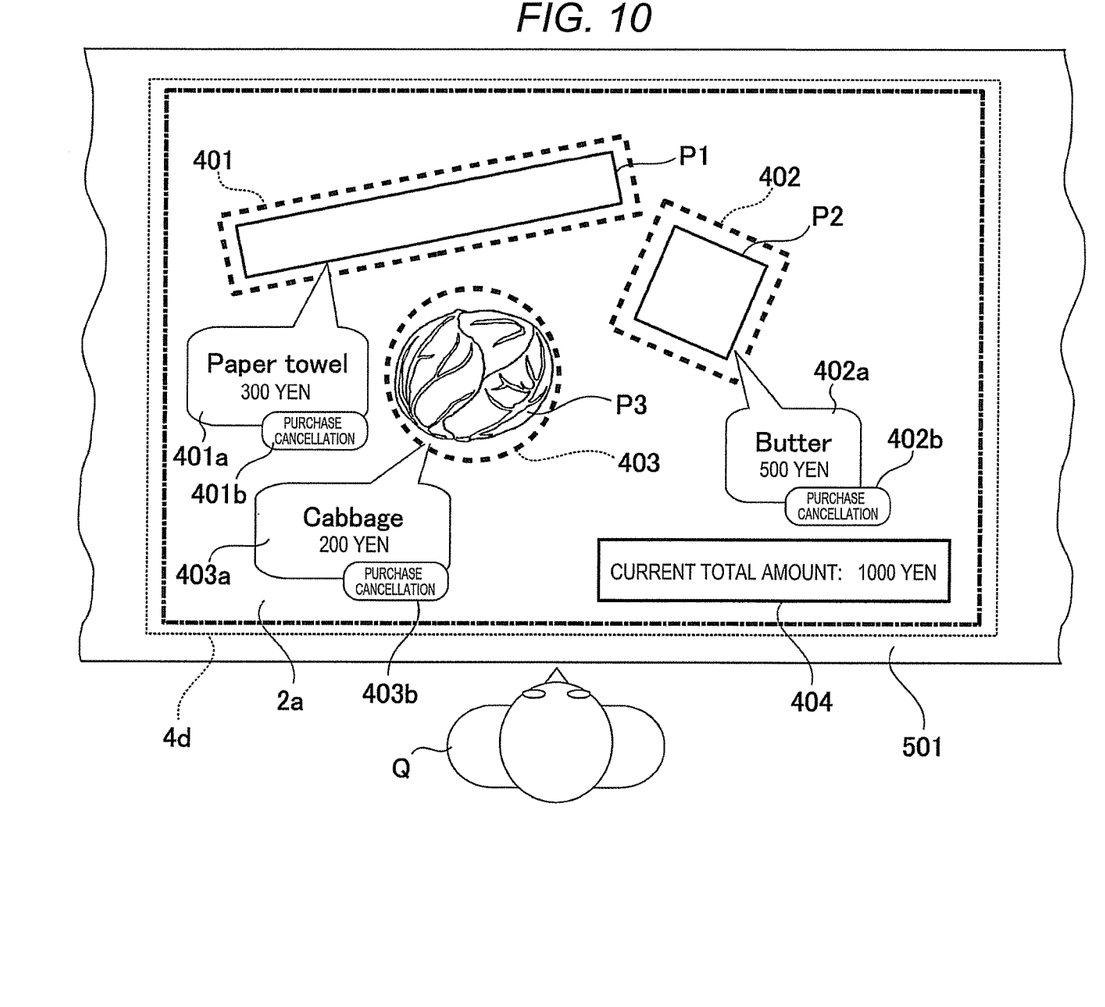
FIG. 10 is a diagram for explaining another flow of the accounting processing in the commodity-sales-data processing system.

Specifically, the CPU 101 (the amount calculating section) adds, to a total payment amount, an amount based on price information acquired concerning a commodity removed from the image pickup region among the commodities disposed in the image pickup region (ACT 106 to ACT 108). FIG. 8 shows a state in which a selling price (500 yen) of butter is added to a payment amount display field 404 on the display screen 4d of the touch panel display 4 because the butter P2 is removed from the display screen 4d of the touch panel display 4. FIG. 9 shows a state in which a selling price (300 yen) of the paper towel P1 and a selling price (200 yen) of the cabbage P3 are added to the payment amount display field 404 on the display screen 4d of the touch panel display 4 and a total of a payment amount increases to 1000 yen because all of the remaining commodities are removed from the display screen 4d of the touch panel display 4.

Note that the CPU 101 (the display control section) displays, on the basis of the positions and the postures recognized concerning the commodities, in regions corresponding to the commodities, the price information of which is acquired, cancellation buttons 401b to 403b for receiving cancellation operation for the purchase of the commodities.

If the cancellation operation by the customer Q or the operator is performed in the regions corresponding to the cancellation buttons 401b to 403b on the display screen 4d of the touch panel display 4, the CPU 101 (the amount calculating section) excludes, from accounting targets, commodities corresponding to the cancellation buttons that receive the cancellation operation and does not include prices of the commodities in a payment amount.

Note that the CPU 101 (the position recognizing section) can also recognize, on the basis of images picked up by the camera 2 and a load distribution of the commodities placed on the display screen 4d of the touch panel display 4, the positions and the postures of the commodities disposed in the predetermined image pickup region. For example, if a canned beverage is placed sideways on the display screen 4d of the touch panel display 4, a rectangular contour is seen on the picked-up image by the camera 2. However, a load distribution on the display screen 4d of the touch panel display 4 is a thin linear region. In this way, by performing the determination based on the detection data by both of the camera 2 and the touch panel display 4, it is possible to more accurately recognize the positions and the postures of the commodities.

Note that, in this embodiment, as an example, the touch panel display 4 is adopted as the display section. However, display of a video on the surface on which the commodities are placed does not always need to be performed by the touch panel display. For example, a video may be projected on the placing surface by a projector.

Naturally, the calculation of a payment amount by the CPU 101 (the amount calculating section) is not limited to the method of adding a selling price of a commodity to a payment amount when the commodity is removed from the display surface. A total amount of prices of all the placed commodities may be displayed in the payment amount display field 404 on the display screen 4d of the touch panel display 4. Consequently, the customer Q can grasp a payment amount of all the commodities placed on the placing table 5 and exclude any commodity from accounting targets using the purchase cancellation buttons.

Modification

Figure 11:
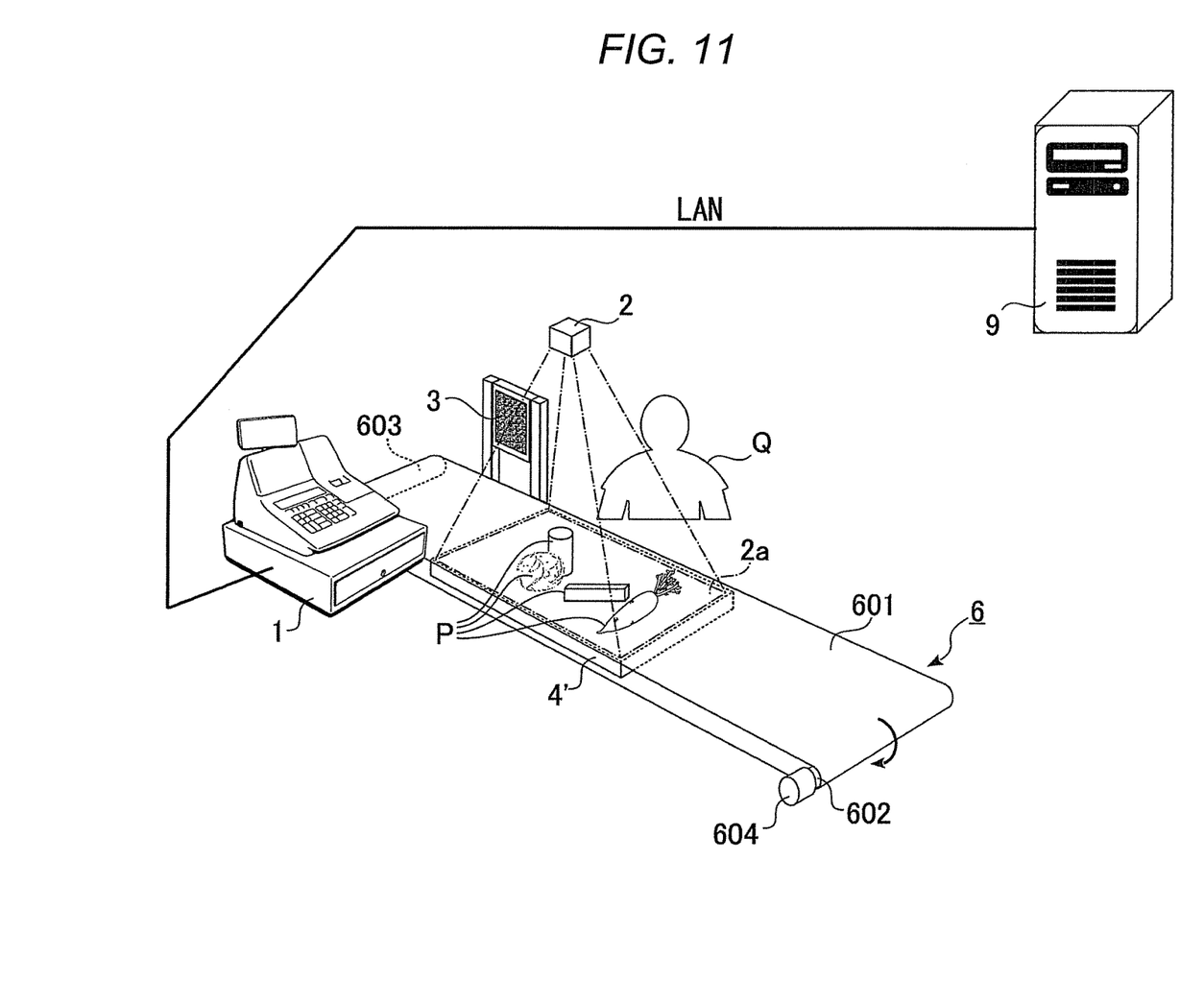
FIG. 11 is a diagram showing a commodity-sales-data processing system according to a modification of the embodiment.

A modification of the embodiment is explained with reference to FIG. 11.

In the embodiment, the accounting target commodities are directly placed on the display screen 4d of the touch panel display 4.

However, not only this, but, for example, a display 4' not having a function of receiving an operation input may be adopted as the display section and a belt conveyor 6 may be adopted instead of the placing table 5 in order to improve efficiency of accounting work. Components in this modification are the same as the components in the embodiment except that the placing table 5 is changed to the belt conveyor 6.

The belt conveyor 6 includes a motor 604, a roller 602, a roller 603, and a transparent conveying belt 601 wound and suspended on the roller 602 and the roller 603. The display 4' is disposed on the inner side of the conveying belt 601. The motor 604 is controlled to be driven by, for example, the CPU 101.

In such a configuration as well, it is possible to realize the various functions explained above excluding processing in which the operation input function (e.g., detection of a load distribution) on the touch panel display needs to be used.

The operations in the processing in the commodity-sales-data processing system are realized by causing the CPU 101 and the CPU 901 to execute a commodity-sales-data processing program stored in the memory 103 and the memory 903.

Further, a computer program for causing a computer configuring the commodity-sales-data processing apparatus to execute the operations explained above can be provided as the commodity-sales-data processing program. In the example explained in this embodiment, the computer program for realizing the functions for carrying out the invention is recorded in advance in the storage region provided inside the apparatus. However, not only this, but the same computer program may be downloaded from a network to the apparatus. A computer-readable recording medium having the same computer program stored therein may be installed in the apparatus. A form of the recording medium may be any form as long as the recording medium is a recording medium capable of storing a computer program and readable by a computer. Specifically, examples of the recording medium include internal storage devices mounted on the inside of a computer such as a ROM and a RAM, portable storage media such as a CD-ROM, a flexible disk, a DVD disk, a magneto-optical disk, and an IC card, a database that stores a computer program, other computers and databases of the computers, and a transmission medium on a line. The functions obtained by the installation or the download in advance in this way may be realized in cooperation with an OS (operating system) or the like in the apparatus.

Note that a part of the computer program or the entire computer program may be a dynamically-generated execution module.

It goes without saying that it is also possible to cause an ASIC to execute, in terms of a circuit, at least a part of the various kinds of processing realized by causing the processor to execute the computer program in the embodiment.

As explained above in detail, according to the technique described in this specification, it is possible to provide a technique for calculating a payment amount for commodities on the basis of images obtained by subjecting the commodities to image pickup.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A commodity-sales-data processing apparatus comprising:
a touch panel display;

an image pickup section configured to pick up images of commodities placed in a predetermined image pickup region on a display region of the touch panel display;

an identifying section configured to identify the commodities disposed in the predetermined image pickup region on the basis of the images picked up by the image pickup section, wherein the identifying section identifies the commodities based on a function of barcode image information and coincidence ratio image information based on a color, a dimension, and a shape of a commodity of the commodities, and wherein the function more heavily weights the coincidence ratio image information when a reliability of the barcode image information is low;

a price-information acquiring section configured to acquire price information concerning prices of the commodities identified by the identifying section;

a position recognizing section configured to recognize, on the basis of the images picked up by the image pickup section, positions of the commodities disposed in the predetermined image pickup region;

a display control section configured to cause, on the basis of the positions of the commodities recognized by the position recognizing section, the touch panel display to display, in display regions corresponding to the commodities, the price information of which is acquired, an amount based on the price information acquired concerning the commodity, the display control section displays, on the basis of the positions recognized by the position recognizing section, in regions corresponding to the commodities, the price information of which is acquired, cancellation buttons for receiving cancellation operation for purchase of the commodities, and an amount calculating section configured to calculate a payment amount for the commodities on the basis of the price information acquired by the price-information acquiring section, the amount calculating section does not include, in the payment amount, prices of the commodities corresponding to the cancellation buttons that receive the cancellation operation.

2. The apparatus according to claim 1, wherein the amount calculating section adds, to a total payment amount, an amount based on price information acquired concerning a commodity removed from the image pickup region among the commodities disposed in the image pickup region.

3. The apparatus according to claim 1, further comprising a display control section configured to control information that the display control section causes the touch panel display to display, wherein the display control section changes a display color in the touch panel display during the image pickup of the commodities by the image pickup section.

4. A commodity-sales-data processing method comprising:

picking up images of commodities placed in a predetermined image pickup region on a display region of a touch panel display;

identifying the commodities disposed in the predetermined image pickup region on the basis of the picked-up images, wherein the identifying identifies the commodities based on a function of barcode image information and coincidence ratio image information based on a color, a dimension, and a shape of a commodity of the commodities, and wherein the function more heavily weights the coincidence ratio image information when a reliability of the barcode image information is low;

acquiring price information concerning prices of the identified commodities;

calculating a payment amount for the commodities on the basis of the acquired price information;

recognizing, on the basis of the picked-up images, positions of the commodities disposed in the predetermined image pickup region;

causing, on the basis of the recognized positions of the commodities, the touch panel display to display, in display regions corresponding to the commodities, the price information of which is acquired, an amount based on the price information acquired concerning the commodity;

recognizing, on the basis of the picked-up images, positions of the commodities disposed in the predetermined image pickup region, wherein cancellation buttons for receiving cancellation operation for purchase of the commodities are displayed in regions corresponding to the commodities, the price information of which is acquired, on the basis of the recognized positions, and prices of the commodities corresponding to the cancellation buttons that receive the cancellation operation are not included in the payment amount.

5. The method according to claim 4, wherein an amount based on price information acquired concerning a commodity removed from the image pickup region among the commodities disposed in the image pickup region is added to a total payment amount.

6. A computer-readable storage medium having stored therein a commodity-sales-data processing program for causing a computer to execute processing for:

picking up images of commodities placed in a predetermined image pickup region on a display region of a touch panel display;

identifying the commodities disposed in the predetermined image pickup region on the basis of the picked-up images, wherein the identifying identifies the commodities based on a function of barcode image information and coincidence ratio image information based on a color, a dimension, and a shape of a commodity of the commodities, and wherein the function more heavily weights the coincidence ratio image information when a reliability of the barcode image information is low;

acquiring price information concerning prices of the identified commodities;

calculating a payment amount for the commodities on the basis of the acquired price information;

recognizing, on the basis of the picked-up images, positions of the commodities disposed in the predetermined image pickup region; and causing, on the basis of the recognized positions of the commodities, the touch panel display to display, in display regions corresponding to the commodities, the price information of which is acquired, an amount based on the price information acquired concerning the commodity;

recognizing, on the basis of the picked-up images, positions of the commodities disposed in the predetermined image pickup region, wherein cancellation buttons for receiving cancellation operation for purchase of the commodities are displayed in regions corresponding to the commodities, the price information of which is acquired, on the basis of the recognized positions, and prices of the commodities corresponding to the cancellation buttons that receive the cancellation operation are not included in the payment amount.

* * * * *